United States Patent [19]

Meinholdt

[11] 4,329,865

[45] May 18, 1982

[54] MATERIAL ENGAGING APPARATUS

[76] Inventor: John W. Meinholdt, 1900 N. Central, Topeka, Kans. 66608

[21] Appl. No.: 193,823

[22] Filed: Oct. 3, 1980

[51] Int. Cl.³ .............................................. B21J 9/18
[52] U.S. Cl. ...................................... 72/389; 72/450; 72/453.03; 83/605; 83/611
[58] Field of Search ................ 83/605, 606, 610, 611; 72/389, 386, 450, 453.03, 387, 388; 100/293, 271, 258, 256

[56] References Cited

U.S. PATENT DOCUMENTS

| | | | |
|---|---|---|---|
| 1,434,060 | 10/1922 | Lautenschlager | 83/527 |
| 1,906,599 | 5/1933 | Hoffert | 83/605 X |
| 2,443,573 | 6/1948 | Brundage | 425/394 |
| 2,461,034 | 2/1949 | Castle | 74/110 |
| 2,558,071 | 6/1951 | Castle, Jr. et al. | 72/29 X |
| 2,890,749 | 6/1959 | Anderson | 83/356.2 |
| 3,205,694 | 9/1965 | Wieger | 72/450 |
| 3,552,183 | 1/1971 | Heitmann | 72/450 |
| 3,577,882 | 5/1971 | Lombard | 72/450 |
| 3,842,651 | 10/1974 | Shaffer | 72/451 |
| 3,941,021 | 3/1976 | Meinholdt | 83/604 |

Primary Examiner—Frank T. Yost
Attorney, Agent, or Firm—Fishburn, Gold and Litman

[57] ABSTRACT

A material engaging apparatus, such as a press brake or shear, has first and second jaw members pivotally mounted together and with coordinating material engaging and working members in the jaw members. An extensible ram positioned along and between the rear sides of the jaw members has one end pivotally mounted to the second jaw member and another end pivotally mounted to a rear end of a lever arm extending from front to rear and spaced adjacent the first jaw member. A front end of the lever arm is pivotally mounted to a front end of the first jaw member. A connecting link extending between the first and second jaw members has a first end pivotally mounted to the lever between the front and rear ends thereof and a second end pivotally mounted to the second jaw member. The connecting link acts as a movable fulcrum for the lever arm and is movable therewith to provide substantially constant leverage as the lever arm moves to urge the first and second jaw members together.

10 Claims, 10 Drawing Figures

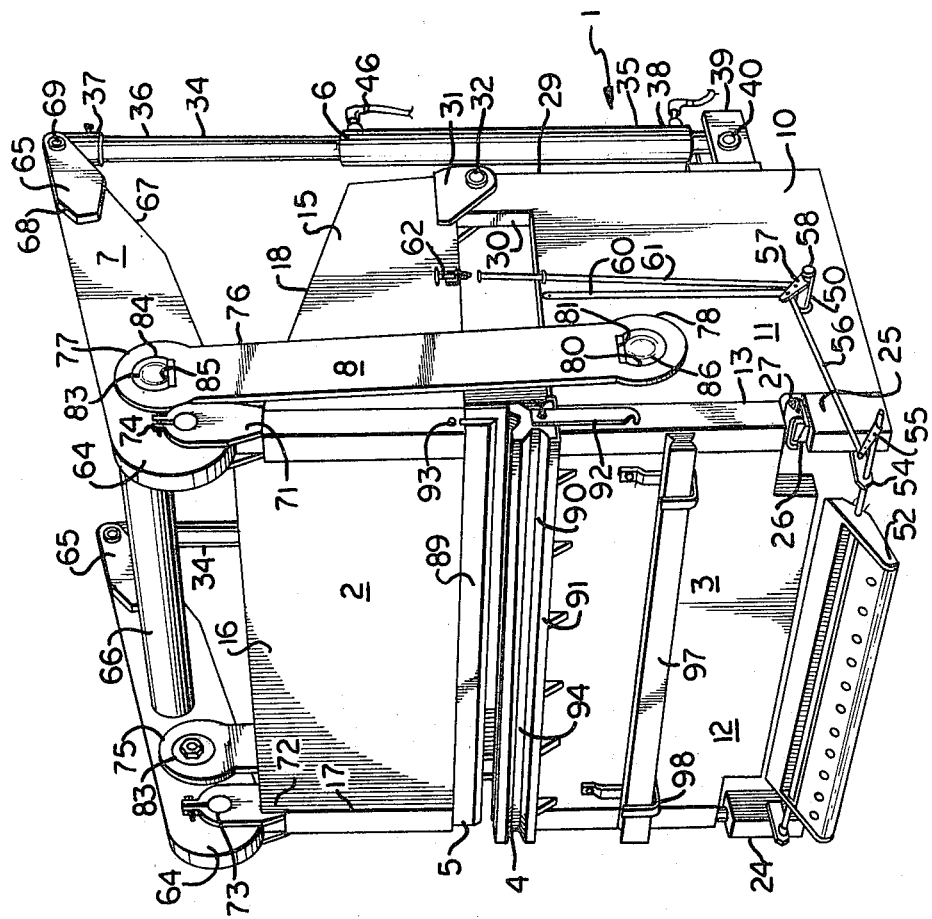

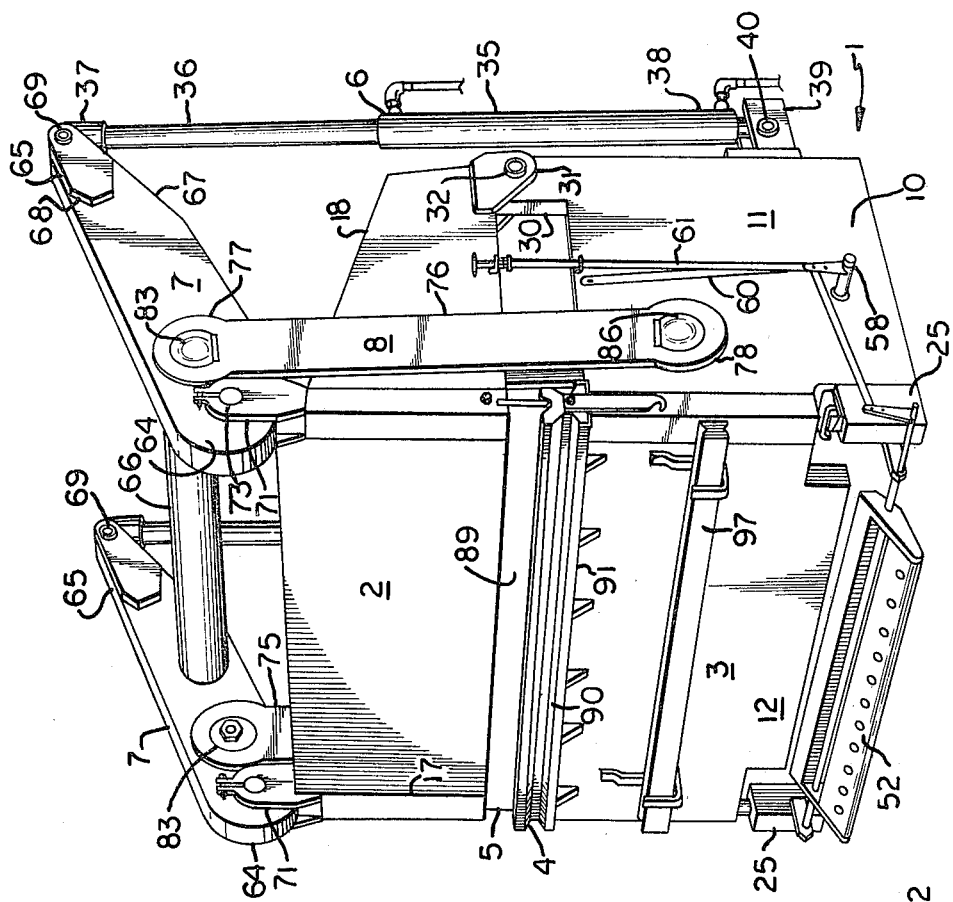
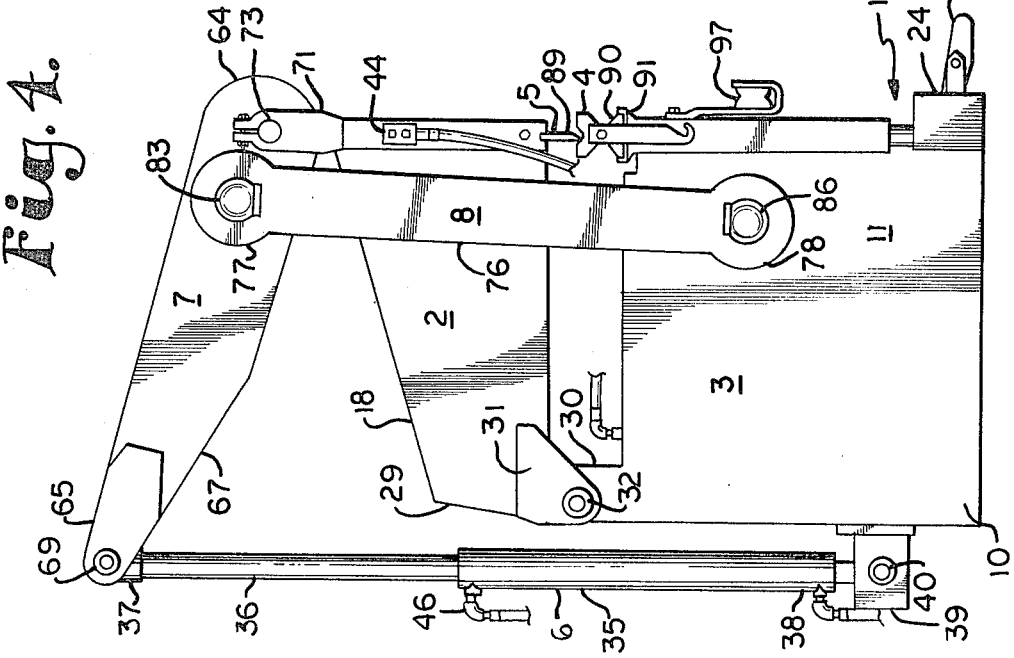

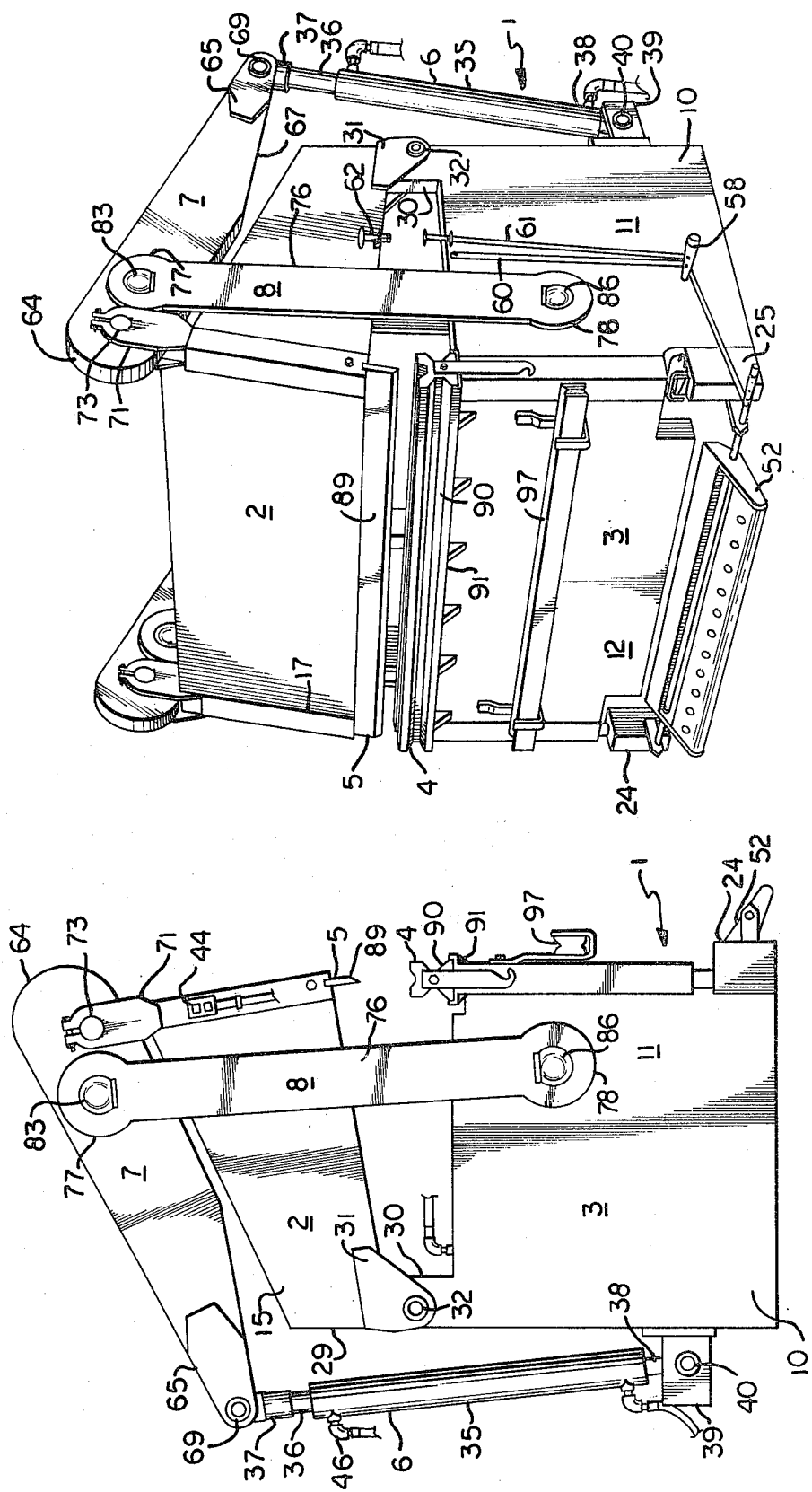

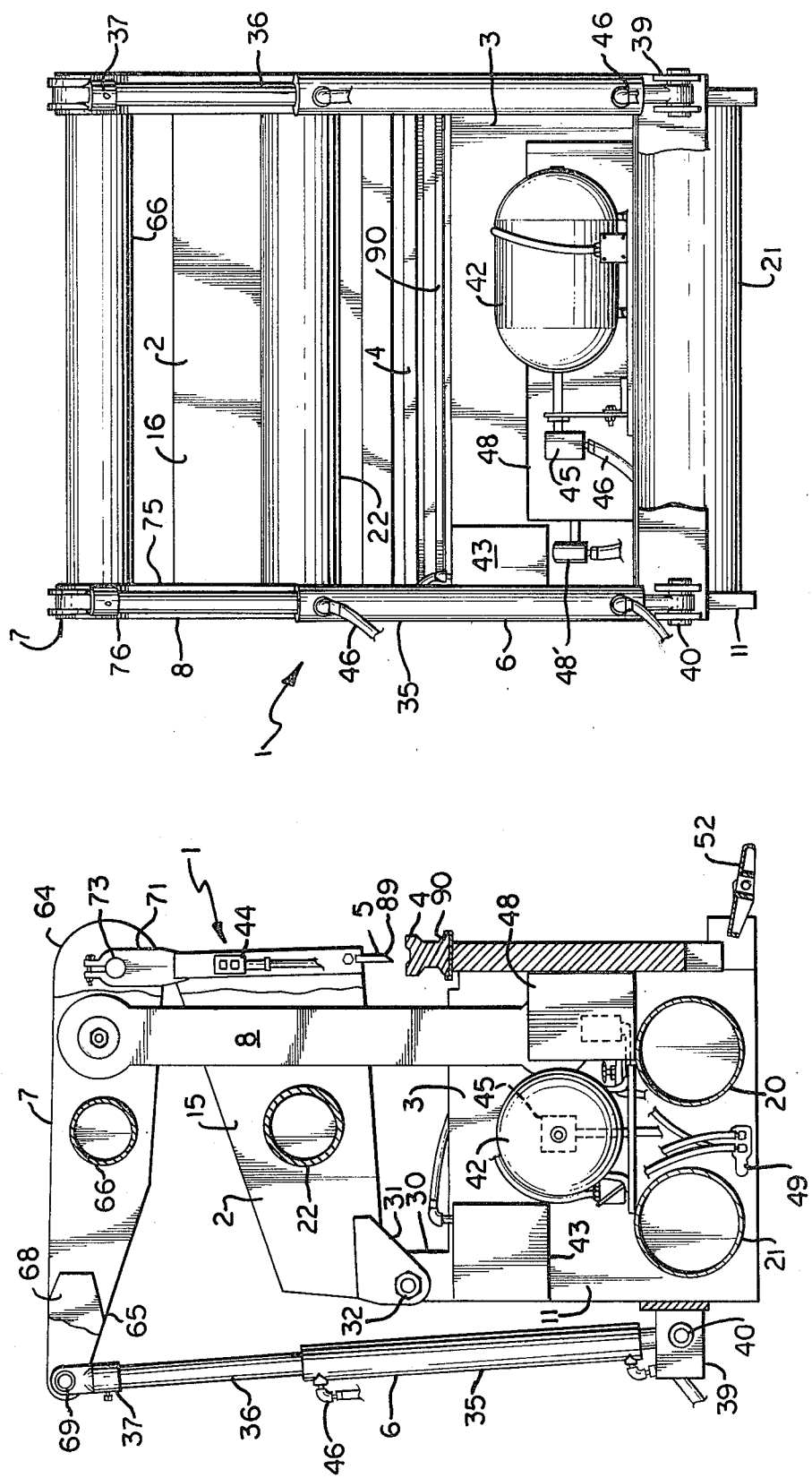

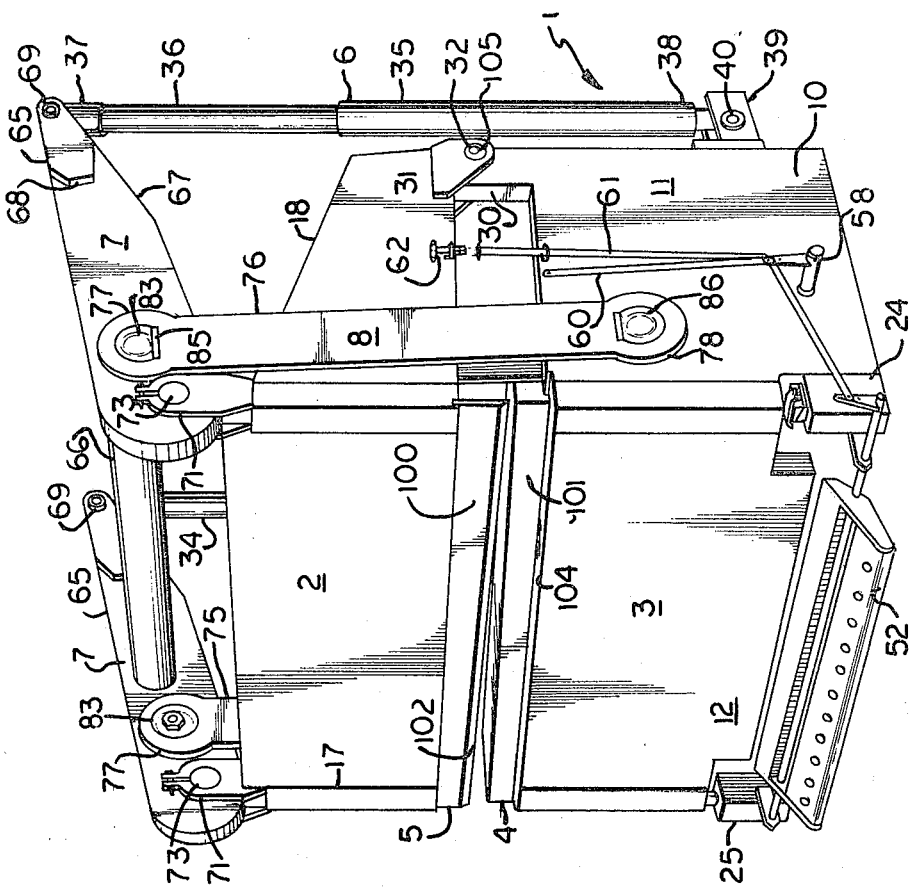
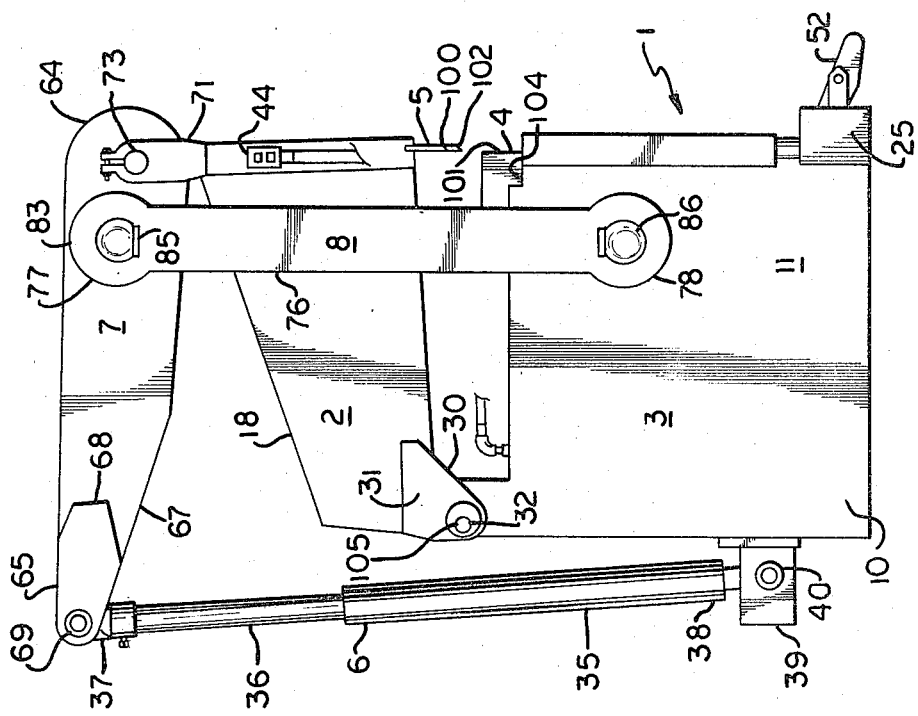

MATERIAL ENGAGING APPARATUS

This invention relates to material engaging apparatuses in general, and in particular, to a material engaging apparatus for machine shop use such as a press brake, shear and the like.

To provide sufficient mechanical power to work materials, such as sheet steel, bars and the like, machine shop equipment must heretofore have been of relatively large, massive size and formed of structural and guide members requiring rather extensive machining. Moreover, such machine shop equipment typically utilizes large amounts of metal during the construction thereof to apply even working forces to the material to be bent, sheared or otherwise worked.

Yet another problem encountered with conventional machine shop material engaging apparatuses involves the amount of leverage force that must be applied to work the material. These forces are typically high and require power fluid pumps and motors of large capacity and high electrical power requirements. The levers and fulcrum devices of such apparatuses are generally positioned so that leverage is greatest only during a portion of the travel of the material engaging members and is not relatively constant in application of the force. Thus, relatively high amounts of ineffectively leveraged force are applied by typical material engaging apparatuses, thereby lessening the possible effectiveness of such tools.

In view of the above, the principle objects of the present invention are: to provide a linkage arrangement for a material engaging apparatus that provides a relatively constant leverage advantage for material engaging and working members; to provide a material engaging apparatus having pivotally interconnected jaw members, a lever arm pivotally mounted on one of the jaw members, an extensible member mounted to the other of said jaw members, and a double pivotally mounted connecting link extending between the other jaw member and pivotally mounted to the lever arm to provide a movable fulcrum for the lever arm; to provide a material engaging apparatus adaptable for use such as a press brake or as a shear; to provide such an apparatus in which pivotal mounts between jaw members act as guides; and to provide such an apparatus which is relatively inexpensive, sturdy and efficient in use and particularly well adapted for its intended purpose.

Other objects and advantages of this invention will become apparent from the following description taken in connection with the accompanying drawings wherein are set forth, by way of illustration and example, certain embodiments of this invention.

FIG. 1 is a perspective view of a material engaging apparatus embodying the present invention with the jaw members thereof in a partially closed position.

FIG. 2 is a side elevational view of the material engaging apparatus having the jaw members thereof in a partially closed position.

FIG. 3 is a perspective view of the material engaging apparatus with the jaw members thereof in a fully closed position.

FIG. 4 is a side elevational view of the material engaging apparatus with the jaw members thereof in a fully closed position.

FIG. 5 is a perspective view of the material engaging apparatus with the jaw members thereof generally in a fully open position.

FIG. 6 is a side elevational view of the material engaging apparatus with the jaw members thereof in a fully open position.

FIG. 7 is a rear elevational view of the material engaging apparatus.

FIG. 8 is a fragmentary, side elevational view of the material engaging apparatus and shows the inner structure thereof.

FIG. 9 is a side elevational view of an alternate embodiment of the material engaging apparatus and showing same in use as a shear.

FIG. 10 is a perspective view of the alternate embodiment of the material engaging apparatus.

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a material engaging apparatus embodying the present invention and for use such as a press brake or shear. The material engaging apparatus 1 has first and second jaw members 2 and 3 pivotally mounted together at a rear side thereof. Coordinating tool holder means 4 and 5 are received in the first and second jaw members 2 and 3 and mounted adjacent the jaw member front sides. Spaced extensible members 6 are positioned along the jaw member rear sides and extend generally between the first and second jaw members 2 and 3. Lever arms 7 are spaced from the first jaw member 2 and positioned generally to extend from the front to the rear thereof and with each lever arm front end pivotally mounted to the front end portions of the first jaw member 2. Each lever arm 7 rear end is pivotally mounted to one end of each extensible member 6. The other end of each extensible member is mounted to the second jaw member 3.

Spaced connecting links 8 extend between the first and second jaw members 2 and 3 and each has one end pivotally mounted to each lever arm 7 between the pivotal mountings thereof with the first jaw member 2 and the respective extensible member 6. Each connecting arm 8 is movable to rock forwardly and rearwardly and provides a movable fulcrum for the respective lever arm 7 to furnish a substantially constant rate of leverage to evenly urge the first and second jaw members 2 and 3 together.

In the illustrated example, the first and second jaw members 2 and 3 are members of a main frame 10 adapted to be positioned upon the floor in an upstanding relationship and with the tool holder means 4 and 5 thereof at a height suitable for normal, human arm level working of materials. The exemplary second jaw member 3 is a support member that is positioned upon the floor and on which the first jaw member 2 is mounted. The second or lower jaw member 3 has spaced, opposite walls forming ends 11 with a front wall 12 extending therebetween. Spaced, opposite front corners are reinforced by corner braces 13. The opposite ends 11 and front wall 12 are preferably of a sturdy, deformation resistant material such as steel plate welded or otherwise secured at the junctures thereof. Similarly, the first or upper jaw member 2 has spaced, opposite walls forming ends 15 and a front wall 16 secured together and strengthened at the juncture by corner braces 17. The opposite ends 11 and front wall 12 of the second or lower jaw member 3 and the front wall 16 of the first or upper jaw member 2 are generally rectangular in shape. The opposite ends 15 of the first or upper jaw member 2 have rearwardly and downwardly inclined upper edges 18 to provide accomodation for the respective lever arms 7. Rear portions, FIG. 7, of the first and second jaw members 2 and 3 are substantially open for access to interior operating members thereof.

Extending between the walls of the opposite ends 11 and 12 of the second or lower jaw member 3 and providing structural strength and rigidity therefor are spaced tubular crossmembers or braces 20 and 21 having opposite ends thereof welded or otherwise secured to the interior surfaces of the walls or ends 11. A single tubular cross member or brace 22 extends between the opposite walls or ends 15 of the first or upper jaw member 2 and is likewise secured to the interior surfaces thereof. The tubular braces 20, 21 and 22 provide protection against torquing or twisting of the respective end walls relative to each other and thereby prevent misalignment or improper working of the tool holder means 4 and 5. To establish the second or lower jaw member 3 in a level position on the floor, a corner block 24 abuts the floor and a second corner block 25 has a leveling means therewith such as leveling adjustment ramps or wedges 26 and a screw adjuster 27 to slide the ramps relative to each other to raise and lower the second corner 25.

A hinge means 28 pivotally connects the jaw members 2 and 3 at a rear portion 29 thereof and in the illustrated example, arms 30 protrude upwardly from the walls of the opposite ends 11 and are respectively received between bifurcated arms 31 extending downwardly from the end walls of the first or upper jaw member 2. A hinge or bearing and pivot pin 32 rotatably connects the arm 30 between the bifurcated arms 31 for upward and downward movement of the first or upper jaw member 2 relative to the second or lower jaw member 3. Preferably, the spaced hinge means 28 act as guides for movement of the first or upper jaw member 2.

The extensible member 6 extends in an upstanding relationship and is positioned along the rear portions 29 of the upper and lower jaw members 2 and 3. The exemplary extensible member 6 includes spaced hydraulic rams 34 each having a cylinder 35 and a piston rod 36 movable with respect to the cylinder 35 by means of hydraulic fluid pressure. A first end 37 of the piston rod 36 is pivotally mounted to the lever arm 7 as described below and a second end 38 is mounted to the second jaw member 3. Bifurcated ears 39 are affixed to lower rear portions 29 extending from the opposite end walls 11 of the second or lower jaw member 3 and the ram second end 38 is pivotally mounted therebetween, such as by a bearing and pivot pin 40.

To provide motive power for the hydraulic rams 34, a motor means is mounted within the second or lower jaw member 3 and includes a motor 42, such as an electrical motor powered through a junction box 43 receiving electrical power through a switch means 44. The motor 42 drives a hydraulic pump 45 connected by suitable conduit 46 to the rams 34. The hydraulic pump 45 draws fluid from a reservoir 48 thereof through a filter 48' and is controlled by a multiport valve arrangement 49 having control linkage 50 connected thereto.

Actuation means govern movement of the control linkage 50 and in the illustrated example, the actuation means includes a foot operated treadle 52 pivotally mounted on a cross rod 53 mounted to spaced supports 54 extending from the corners 24 and 25. Upon rotation, the cross rod 53 rotates a lever arm 55 to pull or push a link rod 56 which is in turn connected to a second lever arm 57 to cause rotation of the control linkage shaft 58. The treadle 52 is pressed in one direction to cause movement of the first jaw member 2 downwardly and in a second direction to return the first jaw member 2 to the upward position. Alternatively, a lever handle 60 is secured to the control linkage shaft 58 and is grasped and pulled or pushed to rotate the shaft 58 and change the internal valving of the valve arrangement 49. Pivotally connected to the control linkage 50 is an adjustment rod 61 including an upper end for abutment with a threaded adjustment knob and shaft 62 to provide a preselected stop for the control linkage 50 and control and extent of downward movement of the first or upper jaw member 2.

In the illustrated example, the lever arms 7 are each positioned generally above and spaced from one of the opposite walls at the ends 15 of the first or upper jaw member 2. The exemplary lever arms 7 are elongate and have opposite front and rear end portions 64 and 65. The front portions 64 have rounded or radius ends for rotation relative to the jaw member 2. The spaced lever arms 7 are connected by a tubular brace 66 extending between lever arm midportions and secured thereto as by welding or the like. Respective rear end portions 65 of the lever arms 7 have lower upwardly inclined edges 67. Reinforcement plates 68 are affixed to the rear end portions 65 as by welding and extend rearwardly to bifurcated ends for receipt of the extensible member first end 37 therebetween, as by a bearing and pivot pin 69, thereby pivotally mounting the lever arm rear end portions 65 to the extensible member 6.

The front end portion of each lever arm 7 is pivotally mounted to the first or upper jaw member 2 and in the illustrated example, bifurcated arm members 71 extend upwardly from each upper corner 72 of the firet or upper jaw member 2. Each lever arm front end portion 64 is received between the bifurcated arm members 71 and pivotally mounted thereto, as by a pivot pin 73, for upward swinging movement. Upper ends 74 of the bifurcated arm members are split and form clamp ends selectively tightenable about the pivot pin 73.

Each connecting link 8 provides a movable fulcrum for the upper arm 7 to exert relatively constant leverage force thereon. In the illustrated example, each connecting link 8 has spaced, parallel inner and outer link arms 75 and 76 respectively positioned adjacent interior and exterior surfaces of the walls at the ends 11 and 15. Each of the link arms 75 and 76 have an enlarged first or upper end 77 and an enlarged second or lower end 78. Apertures 80 extend through each of the ends 77 and 78 and have flats 81 therein.

The first or upper ends 77 of the paired link arms 75 and 76 are positioned on opposite sides and pivotally mounted to each of the lever arms 7 at a pivot position between the lever arm front and rear end portions 64 and 65 and generally adjacent the pivotal mount of the lever arm front end portions 64 with the first or upper jaw member 2. Pivot pins 83 extend through each of the lever arms 7 and the apertures 80 in the link arm upper ends 77 and mount in bearing members 84. An outer bearing flat portion 85 is received within the aperture flat 81 and secures the bearing member 84 against movement relative to the upper ends 77 and to insure rotation of the pivot pins 83 within the bearing members 84. The pivot pin 83 extends through the lever arm 7 at a position generally within a plane extending between the front end pivot pin 73 and the rear end pivot pin 69 and is spaced slightly above said plane.

A like arrangement of bearing members 84 and bearing flat 85 with a pivot pin 86 mount the link arm second or lower ends 78 to the lower jaw member opposite end walls 11 and at a position generally adjacent the corner braces 13.

The illustrated examples, FIGS. 1 through 8, show the material engaging apparatus 1 employed as a press brake and used for bending metal sheets, bars and the like. Therein, the coordinating tool holder means 4 and 5 include an upper material engaging or bending blade 89 affixed to and depending from the front of the first or upper jaw member 2 and a lower die bar 90 for engagement with the bending blade 89. The die bar 90 is positioned upon a die support 91 affixed to the front of the second or lower jaw member 3 and having spaced, upturned flanges to cradle the die bar 90. The die bar 90 has swing arms 92 pivotally mounted to opposite ends thereof which swing upwardly to hook over studs 93 in the first or upper jaw member 2 whereby the die bar 90 can be lifted from the die support 91, rotated to present a selected die face 94 for engagement with the blade 89 and then lowered into re-engagement with the die support 91. The plurality of die faces 94 enable different bend angles up to 90° to be formed in the material. Provision is made for an auxiliary die bar 97 for storage on the second or lower jaw member 3, as by spaced hangers 98.

In the use of the material engaging apparatus 1, the first or upper jaw member 2 is raised to an open position, FIGS. 5 and 6, and a piece of material to be worked inserted between the tool holder means 4 and 5, such as the bending blade 89 and die bar 90 when press brake operations are desired. The treadle 52 is depressed in one direction to control the valve arrangement 49 and direct fluid to the hydraulic rams 34. As the piston rods 36 thereof extend, the lever arms rear end portions 65 swing upwardly to exert an upward pivoting force upon the connecting link arms 75 and 76. A leveraged downward force is exerted upon the lever arm front end portions 64 is urge the first or upper jaw member 2 downwardly by pivoting about the pivot pins 73 and 32.

As the piston rod 36 extends, the first or upper jaw member 2 swings downwardly, FIGS. 1 and 2, and the link arm upper ends 74 swing forwardly to provide a movable fulcrum which remains fixed in position relative to the pivot pin 73 extending through the lever arm front end portions 64, thereby providing constant leverage advantage for the extensible members 6. Uppermost extension of the hydraulic ram piston rods 36 are illustrated in connection with FIGS. 3 and 4 wherein the first or upper jaw member 2 is swung completely downwardly to engage the bending blade 89 with the die bar 90 and bend material positioned therebetween. In this downward position, the first or upper ends 77 of the link arms 75 and 76 are swung to their forwardmost position as opposed to the rearmost position when the first or upper jaw member 2 is completely open, FIGS. 5 and 6.

An alternate embodiment of the material engaging apparatus 1 is shown in connection with FIGS. 9 and 10 wherein the apparatus 1 is employed as a shear. Accordingly, the coordinating tool holder means 4 and 5 include an upper shear blade 100 and a lower anvil 101. The shear blade 100 has a longitudinal rake angle and a sharpened edge 102 which slices against the anvil 101. The anvil 101 is mounted on an anvil support 104 in the second or lower jaw member 3.

To prevent rotational movement, other than downward shearing movement, of the blade 100 as it slides against the anvil 101, the exemplary pivot pins 32 pivotally mounting the first and second jaw members 2 and 3 together are eccentric pins 105. The eccentric pins 105 urge the first or upper jaw member 2 upwardly at a rear portion thereof as the shear blade 100 moves downwardly and slides against the anvil 101 so that substantially straight downward movement of the first or upper jaw member 2 occurs during shearing.

It is within the concept of this invention that other tool holding means besides a press brake or shear may be employed in connection with the material engaging apparatus 1 and that while certain forms of this invention have been illustrated and described, the invention is not to be limited to the specific arrangement of parts herein described and shown, except insofar as such limitations are included in the following claims.

What is claimed and desired to secure by Letters Patent is:

1. A material engaging apparatus comprising:
   (a) first and second jaw members with respective front and rear sides, said first jaw member being pivotally mounted to said second jaw adjacent the rear sides thereof;
   (b) coordinating tool holder means mounted in said first and second jaw members adjacent the front sides thereof;
   (c) an extensible member positioned along said rear sides and extending generally between said first and second jaw members; said extensible member having first and second ends with said second end pivotally mounted to said second jaw member;
   (d) a lever arm spaced from said first jaw member and having front and rear ends with said front end pivotally mounted to said first jaw member adjacent said front side thereof and said rear end pivotally mounted to said extensible member first end; and
   (e) a connecting link having first and second ends with said first end pivotally mounted to said lever arm between the front and rear ends thereof, said second end being pivotally mounted to said second jaw member whereby said connecting link comprises a fulcrum for said lever arm movable to provide substantially constant leverage to urge said first and second jaw members together.

2. The material engaging apparatus set forth in claim 1 wherein:
   (a) said first and second jaw members are elongate and have opposite ends;
   (b) an extensible member is positioned adjacent each of said ends;
   (c) a lever arm is positioned adjacent each of said ends;
   (d) a connecting link is positioned generally against each of said ends.

3. The material engaging apparatus set forth in claim 1 wherein:
   (a) said coordinating tool holder means are press brake means including a material engaging blade and a die bar.

4. The material engaging apparatus set forth in claim 1 wherein:
  (a) said coordinating tool holder means are shear means including a shear blade and an anvil bar.

5. The material engaging apparatus set forth in claim 1 wherein:
  (a) said extensible member includes a hydraulic ram; and including
  (b) motor means and hydraulic pump means associated with one of said first and second jaw members and operatively connected to said ram to selectively cause extension and retraction thereof.

6. A material engaging apparatus comprising:
  (a) a main frame having an upper jaw member and a lower support member respectively having opposite ends and front and rear sides, said upper jaw member having hinge means pivotally mounting said upper jaw member to said lower support member adjacent the rear sides thereof;
  (b) a material engaging means and a material support means respectively mounted in said upper jaw member and said lower support member at said front sides and movable into an interengaged position to work material;
  (c) said hinge means being positioned generally in front to rear alignment with said material engaging means and said material support means when said material engaging means and said material support means are in an interengaged position;
  (d) an extensible member upstanding and positioned along the rear sides of said upper jaw member and lower support member, said extensible member having upper and lower ends and pivotal means affixing said lower end to said lower support member;
  (e) a lever arm positioned generally over said upper jaw member and having a front end with pivotal means affixing said front end to said upper jaw member adjacent the front side thereof and a rear end with pivotal means affixing said rear end to the upper end of said extensible member; and
  (f) an upstanding connecting link having upper and lower ends with pivotal means mounting said link upper end to said lever arm between the front and rear ends thereof, said link lower end having pivotal means mounting said link lower end to said lower support member, whereby said connecting line comprises a fulcrum for said lever arm swingable forwardly to provide substantially constant leverage to urge said upper jaw member toward said lower support member.

7. The material engaging apparatus set forth in claim 6 wherein:
  (a) the opposite ends of said upper jaw member have end walls with each of said end walls having spaced ears at the rear sides thereof providing a portion of said hinge means;
  (b) two said lever arms each extend generally over one of said end walls, said end walls respectively having spaced ears extending between said end walls and said lever arms at the front sides thereof and providing a portion of said pivotal means;
  (c) the opposite ends of said lower support member have end walls with each of said end walls generally aligned under the end walls of said upper jaw member;
  (d) two said extensible members are positioned along the rear sides of the end walls of the upper jaw member and the lower support member; and
  (e) two said connecting links have the respective lower ends thereof respectively mounted to the end walls of said lower support member.

8. The material engaging apparatus set forth in claim 7 wherein:
  (a) said material engaging means is a press brake blade;
  (b) said material support means is a press brake die bar having a plurality of different die faces therearound, said die bar being rotatable to present selected die faces for engagement with said blade.

9. The material engaging apparatus set forth in claim 7 wherein:
  (a) said material engaging means is a shear blade;
  (b) said material support means is an anvil bar having a forward edge for shearing contact with said shear blade.

10. The material engaging apparatus set forth in claim 9 wherein:
  (a) said hinge means includes a bearing and an eccentric pivot pin positioned to raise said rear side of said upper jaw member with respect to the front side thereof as said shear blade moves downwardly.

* * * * *